United States Patent [19]

Leeuw

[11] Patent Number: 5,651,048
[45] Date of Patent: Jul. 22, 1997

[54] COMMUNICATION CHANNEL SWITCHING ARRANGEMENT

[75] Inventor: Luc Van Leeuw, Herk-De-Stad, Belgium

[73] Assignee: N.V. Raychem S.A., Belgium

[21] Appl. No.: 392,930
[22] PCT Filed: Aug. 13, 1993
[86] PCT No.: PCT/GB93/01717
§ 371 Date: Feb. 24, 1995
§ 102(e) Date: Feb. 24, 1995
[87] PCT Pub. No.: WO94/05108
PCT Pub. Date: Mar. 3, 1994

[30] Foreign Application Priority Data

Aug. 26, 1992 [GB] United Kingdom ............ 9218134

[51] Int. Cl.$^6$ .................. H04M 1/24; H04M 3/08; H04M 3/22
[52] U.S. Cl. .................. 379/2; 379/27; 379/29; 379/30
[58] Field of Search ................. 379/2, 27, 26, 379/29, 30, 399, 400, 412

[56] References Cited

U.S. PATENT DOCUMENTS

| | | |
|---|---|---|
| 4,143,250 | 3/1979 | Simokat . |
| 4,169,220 | 9/1979 | Fields . |
| 4,558,182 | 12/1985 | Perry et al. . |
| 4,653,084 | 3/1987 | Ahuja ............................ 379/29 |
| 4,807,277 | 2/1989 | Perry ............................ 379/29 |
| 4,852,145 | 7/1989 | Bevers et al. ................... 379/27 |
| 4,862,491 | 8/1989 | La Salle et al. ................. 379/29 |
| 5,345,496 | 9/1994 | Galpin ........................... 379/29 |

*Primary Examiner*—Curtis Kuntz
*Assistant Examiner*—Paul Loomis
*Attorney, Agent, or Firm*—Herbert G. Burkard; Bruce M. Bertram

[57] ABSTRACT

A maintenance termination unit (MTU) for use in telephone circuits. The MTU comprises a switching arrangement which can be connected in a communications channel, the communications channel comprising a pair of lines. The switching arrangement is connected between a set of exchange-side terminal equipment and a set of subscriber-side terminal equipment. The arrangement comprises first and second line switches, each of which is series connected in one of the lines. Each line switch comprises a control terminal, and has a closed state in which it will pass normal line current, and an open state in which it will pass at most a reduced line current. The arrangement also comprises a control circuit which is connected to the channel between the line switches and the subscriber-side terminal equipment. The control circuit comprises: a charge reservoir which is connected between the lines; a reservoir charging switch which is connected in series with the charge reservoir and controls the charging of the reservoir in response to a signal on the lines; and a reservoir discharging switch which is controlled by a signal on the lines and will allow the reservoir, when charged, to energize the control terminals of the line switches so that, when the line switches are opened by the control circuit, the line switches can be maintained in an open state for a period of time by discharging the reservoir.

12 Claims, 3 Drawing Sheets

COMMUNICATION CHANNEL SWITCHING ARRANGEMENT

BACKGROUND OF THE INVENTION

This invention relates to communications circuits, and especially to maintenance termination units for use in telephone circuits.

In recent years, and especially in view of deregulation of many telephone systems, privately owned communication equipment has increasingly been installed in the premises of subscribers to the system, with the result that it is often necessary to determine whether any fault is located in the telephone line, or in the subscriber's premises, ie in the subscriber's equipment or cabling, in order to determine whose responsibility it is to repair the fault. It is highly advantageous economically if this determination can be performed remotely by sending an appropriate signal from the local exchange along the line, thereby obviating the necessity to send any telephone company personnel to the subscriber's premises.

In order to test the telephone line for any faults it is necessary firstly to install a so-called "maintenance termination unit" or MTU in the line at the subscriber's premises which can disconnect the subscriber equipment from the line (often called sectionalizing the line) and connect the A and B or tip and ring lines on receipt of the appropriate signals from the exchange. During the line testing procedure determinations will typically be made of the line to line resistance and of the first and second line to ground resistance. Also the line continuity can be determined by detecting the presence of the MTU electronically.

Various forms of MTU are described, for example, in U.S. Pat. No. 4,710,949 to Om Ahuja. This device comprises a pair of voltage sensitive switches, one located in each of the tip and ring lines, and a distinctive termination connecting the tip and ring lines on the subscriber side of the voltage-sensitive switches. The voltage-sensitive switches may each have a threshold voltage of about 16 volts so that they are closed in normal operation by the 48 volt battery voltage but will open when this is replaced by a test voltage below about 32 volts removed in order to test the line-to-ground and tip-to-ring impedances. The distinctive termination may, for example, comprise a back-to-back diode and Zener diode which will exhibit an asymmetric resistance when large voltages (higher than the operating voltages) of different polarity are applied. Other forms of MTU have been proposed in which the switches can be actuated by signals other than d.c. signals of one frequency and send back signals of another frequency.

Generally however, these MTUs suffer from the disadvantage that the control circuitry for operating the switches etc. allows a small leakage current to occur between the two lines when the testing is performed with the result that inaccuracies can occur in the determination of the insulation resistance of the telephone line.

SUMMARY OF THE INVENTION

According to the present invention, there is provided a switching arrangement that can be connected in a communications channel that comprises a pair of lines, between sets of terminal equipment, which comprises:

(i) a line switch, that is series connected in each of the lines; and
(ii) a control circuit for the line switches comprising:
(a) a charge reservoir that is connected between the lines;
(b) a reservoir charging switch that is connected in series with the charge reservoir and controls the charging of the reservoir in response to a signal on the line; and
(c) a reservoir discharging switch that is controlled by a signal on the line and will allow the reservoir when charged to energise control terminals of the line switches so that the line switches can maintain in an open state for a period of time by discharging of the reservoir.

The arrangement according to the present invention has the advantage that it can be connected in a communications channel such as a telephone line so that the control circuit for the line switches is on the subscriber side of line switches, and accordingly it is possible to have no circuitry connecting the lines on the exchange side of the line switches. Thus, when the line switches are opened during a test, the line-to-line resistance of the channel is a correct indication of the channel's insulation resistance. Clearly the control circuit is isolated from the exchange by the line switches during the test and so cannot be accessed from the exchange or receive power from the line. According to the invention the line switches are powered by the discharging of a charge reservoir that has been charged up when the line switches were closed. The control circuit can be arranged so that the line switches will remain open for a length of time that is appropriate for conducting the various tests on the lines, e.g. for a period in the range of from one second to one minute. This may be achieved simply by choosing as the charge reservoir a capacitor having an appropriate size, or by other means such as a timing circuit.

The line switches preferably comprise solid state relays, especially ones that are normally closed. The solid state relays may be located in each of the lines or they may be employed to control a switching circuit. For example, the line switches may comprise a switching transistor whose base or gate voltage is controlled by a control element, e.g. a control transistor, that can turn on, thereby switching the switching transistor off. In a preferred form of arrangement the base or gate voltage of the switching transistor is controlled by a control element such as a control transistor. For example the switching transistors base or gate terminal may be held in a voltage divider that spans the switching transistor, and one arm of which comprises the control transistor. The base or gate terminal of the control transistor is also held in a voltage divider that spans the switching transistor. Such a circuit will open when it is subjected to an overcurrent in the line since the voltage drop across the switching transistor will increase with the line current until the base or gate terminal of the control transistor is at a high enough voltage to turn it on and short the base and emitter or gate and source terminals of the switching transistor thereby turning it off. Alternatively the control element may comprise a comparator that compares a fraction of the voltage across the switching transistor with a reference voltage and opens the switch if the fraction is greater than the reference voltage, as described in our copending international application No. PCT/GB91/02215. Ira normally on FET such as a JFET or a depletion mode MOSFET is employed as the switching transistor, a negative voltage generator e.g. a charge pump, or an optocoupler may be employed as the control element, as described in our copending British application No 9114717.3. The circuit can be used as a switch for example by discharging the charge reservoir into the control transistor base or gate terminal. Alternatively and preferably a further switching element, e.g. a solid state relay, can turn the switching transistor off.

This can be achieved by including the switching element in a place where it can stop the base drive of the switching transistor or cause the gate voltage of a switching FET to be pulled down. By the use of such a form of switch the communications channel can be protected against overcurrents in addition to being remotely sectionalized. An advantage of such an arrangement is that it increases the open state resistance of the line switches considerably, which allows higher test voltages for the line to line and/or line to ground resistance measurement. The voltages and currents employed in the measurement can be any value up to the threshold voltage of any circuit protection elements, e.g the line switches. Preferably the arrangement includes means for reclosing or attempting to reclose the line switches after a period of time has elapsed from their opening. This enables the channel automatically to continue to function after a current transient has been experienced. Examples of reclosing circuits that can be employed for this purpose are described in international application No. WO/9207403, the disclosure of which is incorporated herein by reference.

The series switching circuits may employ bipolar transistors and/or field effect transistors. Where bipoplar transistors are used they are preferably used in a darlington configuration as the switching transistor in order to reduce the base current required when the transistor is switched on. The base current must be supplied via a resistor connected between the base and collector of the switching transistor. When the circuit switches to its blocking or open state the switching transistor base current is diverted through the control transistor (which is now on) and becomes a leakage current. However, since the voltage drop across the resistor is much higher when the arrangement is in its blocking state, the leakage current is larger than the switching transistor base current. If a darlington pair or triplet is employed the effective d.c. current gain will be increased considerably so that a much higher resistance can be used.

Where field effect transistors are employed, MOSFETS are preferred, for example enhancements mode MOSFETS although depletion mode MOSFETs may be employed, particularly where linearity is important. Examples of depletion mode MOSFET switches are described in our copending British patent application No. 9114717.3, the disclosure of which is incorporated herein by reference. The resistors employed in the switching circuit may be provided by MOSFETS, for example with their gates and drains connected as in NMOS logic. Alternatively, the control transistor and the resistor which together form the voltage divider for the base and gate of the switching transistor may be provided by a complementary n-channel and p-channel pair of FETS connected in the manner of CMOS logic.

It is preferred for the series switching circuits to include no resistive components in series with the switching transistor. Such an arrangement not only reduces the voltage drop or insertion loss along the line of circuit, and in addition reduces the area of silicon that need be employed in an integrated circuit design of the arrangement, thereby reducing the cost.

It is possible to control the reservoir charging and/or discharging switches by means of a number of signals. For example, a tone may be sent along the channel and detected by the arrangement. Preferably, however, the reservoir charging and/or discharging switches are controlled by the d.c. voltage on the line. Thus the reservoir can be charged and discharged simply by altering the voltage on the line. In one preferred arrangement the reservoir charging switch is normally open and is closed when the line voltage is raised to a first voltage ($V_1$), and the reservoir discharging switch is normally closed and is opened when the line voltage is raised to a second voltage ($V_2$) which is lower than $V_1$. The charge reservoir can therefore be charged by raising the line voltage to a value above $V_1$ for a period of time, and the line switches can then be opened by reducing the line voltage to an absolute value below $V_2$, thereby allowing the reservoir to energise the control terminals of the line switches.

The voltages employed to actuate the reservoir charging and discharging switches will necessarily be higher that the 48 V battery voltage of the telephone system, but it preferably is not greater than the maximum voltage of the ringing signal (80 V RMS) superimposed on the battery voltage, because of danger to people and equipment. In view of this it will normally be necessary to include a ringing bypass circuit in each line of the channel that will prevent triggering of the line switches by ringing signals on the lines. Such a circuit will normally comprise a simple high pass RC filter with a relatively low cut-off frequency of about 20–50 Hz depending on the country.

In some cases it may be necessary to include a shunt switching circuit that can connect the lines together, optionally via a distinctive termination to enable a loop-back test to be performed on the channel. A distinctive termination is a termination having a characteristic nonlinear resistance so that observation of the distinctive termination will indicated that there is no break in the channel. One typical form of distinctive termination comprises a back-to-back diode and Zener diode although other terminations such as RC terminations can be used. The shunt switching circuit should be located on the exchange side of the line switches (although in some instances it may be required to locate it on the subscriber side).

Preferably all components of the arrangement take their power from the current in the lines or from the voltage drop between them so that no separate power supply rails are needed.

BRIEF DESCRIPTION OF THE DRAWINGS

An arrangement in accordance with the present invention will now be described by way of example with reference to the accompanying drawings in which.

DESCRIPTION OF THE PREFERRED EMBODIMENTS

Figure 1:
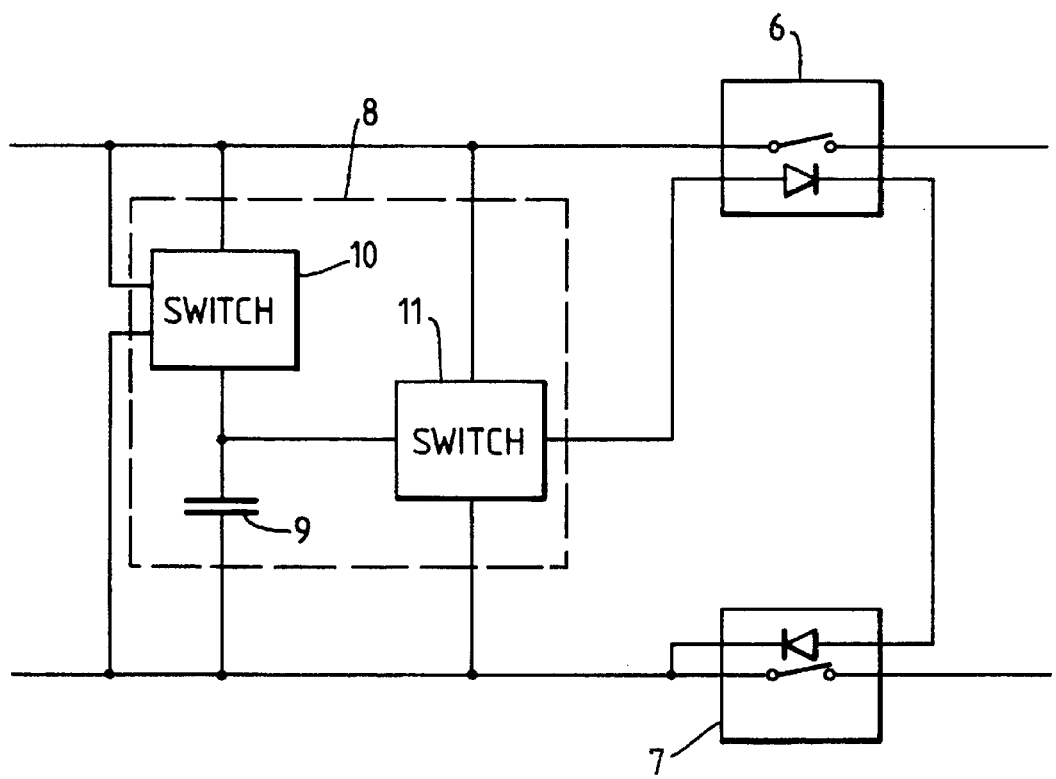
FIG. 1 is a block diagram indicating the main components of the circuit.

Referring to the accompanying drawings, a maintenance termination unit 1 is inserted in a telephone channel having a pair of lines 2 and 3 connecting the telephone exchange 4 to a subscriber 5. The MTU 1 comprises a pair of line switches 6 and 7, one line switch series connected in each of the lines 2 and 3 and a control circuit 8 that is located on the subscriber side of the line switches 6 and 7, and is able to cause switches 6 and 7 to open on receipt of the correct d.c. differential line voltage. the control circuit 8 comprises a capacitor 9 constituting the charge reservoir, connected between the lines 3 and 2 in series with a charging switch 10 whose control terminals connected between the lines 2 and 3. One node of the capacitor 9 is connected to the line switch control terminals via a discharge switch 11 whose control input is also taken across the lines 2 and 3.

By applying one differential voltage across the lines, the discharging switch 11 can be opened and charging switch 10 closed in order to charge capacitor 9 up, and by altering the voltage the capacitor can be caused to discharge through the line switch 6 and 7 inputs, thereby opening the line switches while the capacitor discharges and enables the lines to be sectionalised.

Figure 2:
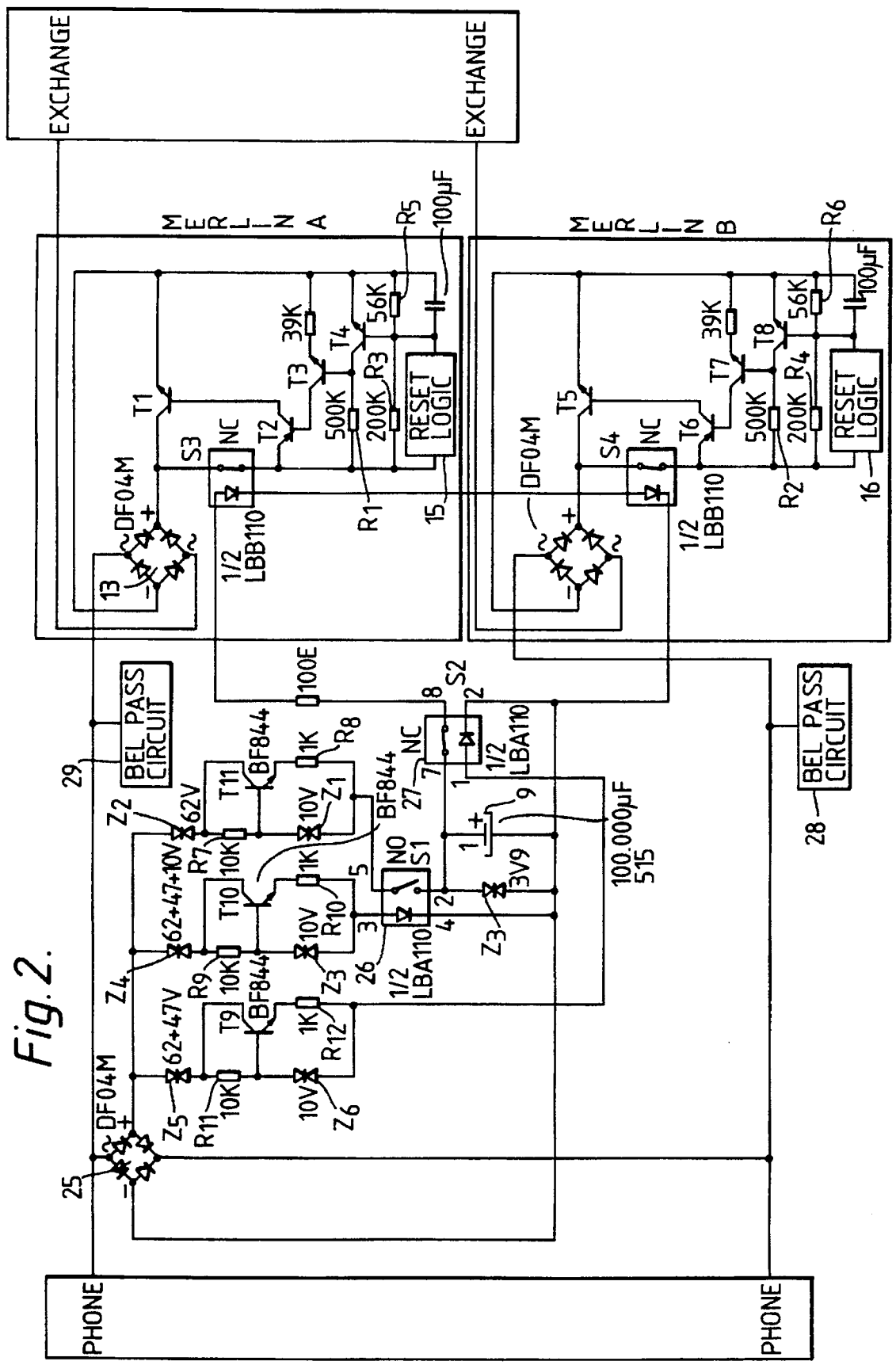
FIG. 2 is a circuit diagram of the arrangement.

FIG. 2 shows the MTU circuit in more detail.

The line switches 6 and 7 each comprise a switching circuit arranged in a diode bridge 13 and 14, the switching circuit being formed from a switching transistor formed from complementary darlington triplets $T_1$, $T_2$, $T_3$ and $T_5$, $T_6$, $T_7$, the base terminal of which is held in a voltage divider formed from 500 kΩ resistor $R_1$, $R_2$, and a control transistor $T_4$ and $T_8$, the control transistors being connected between the base and emitter of transistors $T_3$ and $T_7$ of the darlington triplets. The base terminal of the control transistor $T_4$ and $T_8$ are held in a voltage divider formed from a 200 kΩ resistor $R_3$ and $R_4$, and 39 kΩ resistor $R_5$ and 56 kΩ resistor $R_6$. These switching circuits will allow normal signals to pass but, if subjected to an overcurrent, the base-emitter voltage of the control transistors $T_4$ and $T_8$ will increase until they turn on and short the base and emitter terminals of transistor $T_3$ and $T_7$. Once the line switching circuits have switched they will remain latched open because the entire system voltage will be dropped across them In order to prevent the subscriber being cut off due to current transients, resetting logic circuits 15 and 16 send a series of pulses into the base of the control transistors $T_4$ and $T_8$ in order to cause them to reset or attempt to reset the switches.

Although the switching circuits will act as foldback switches there will be a small leakage current through resistors $R_1$, $R_2$, $R_3$, $R_4$ and transistors $T_4$ and $T_8$. This leakage current is undesirable when testing the channel for line-to-line resistance. This can be removed by means of a normally closed solid state relay 20 and 21 connected in the node formed by the potential dividers and the collector terminal of the switching transistors $T_1$ and $T_5$. If the solid state relays are opened, no leakage current can flow through the switching circuits.

The control circuit is located within a further diode bridge 25 and comprises a 100,000 μF capacitor 9 that forms the charge reservoir connected between one of the lines and a normally on solid state relay 26. The current that is allowed to pass through the switch is limited to about 10 mA by means of a current limiting circuit comprising transistor $T_{11}$, base resistor $R_7$, emitter resistor $R_8$ and a Zener diode $Z_1$ having a 10 V breakdown voltage. A 62 V breakdown voltage Zener diode $Z_2$ is connected in series with the current limiting circuit, and a 3.9 V Zener diode $Z_2$ is connected in parallel with capacitor 9 in order to limit the stored charge. The control terminals of the solid state relay 26 are connected to the lines via a second 10 mA current limiting circuit comprising transistor $T_{10}$, resistors $R_9$ and $R_{10}$ and Zener diode $Z_3$ in order to protect the driver diode of the solid state relay, And via a 120 V Zener diode $Z_4$.

The capacitor 9 is connected in parallel with the inputs of each of the solid state relays 20 and 21 via a discharging switch comprising a normally closed solid state relay 27 whose input is taken from the lines 2 and 3 via a 110 V Zener diode $Z_5$ and a further 10 mA current limiting circuit comprising transistor $T_9$, resistors $R_{11}$ and $R_{12}$ and Zener diode $Z_6$.

A pair of RC ringing bypass circuits 28 and 29 are connected in the lines in order to prevent triggering of the arrangement by the telephone ringing signal.

In operation the subscriber may be isolated from the exchange by a process which comprises raising the line voltage to above 135 V. As the voltage increases to above 120 V solid state relay 27 will open, and then, as the voltage increases beyond about 135 V, solid state relay 26 will close, thus allowing capacitor 9 to charge. After a period of about 40 seconds when the capacitor 9 is charged, the line voltage is reduced to a value less than 120 V. As the line voltage falls below 135 V solid state relay 26 opens to discontinue the charging process, and when it falls to below 120 V solid state relay 27 closes, thereby allowing capacitor 9 to discharge into the inputs of solid state relays 20 and 21 which causes the line switches to open. In this way the subscriber can be isolated from the exchange side of the line switches, thereby allowing accurate determination of the line-to-line and line-to-ground resistance. The line switches will remain open for a period of approximately 20 seconds before capacitor 9 discharges.

Figure 3:
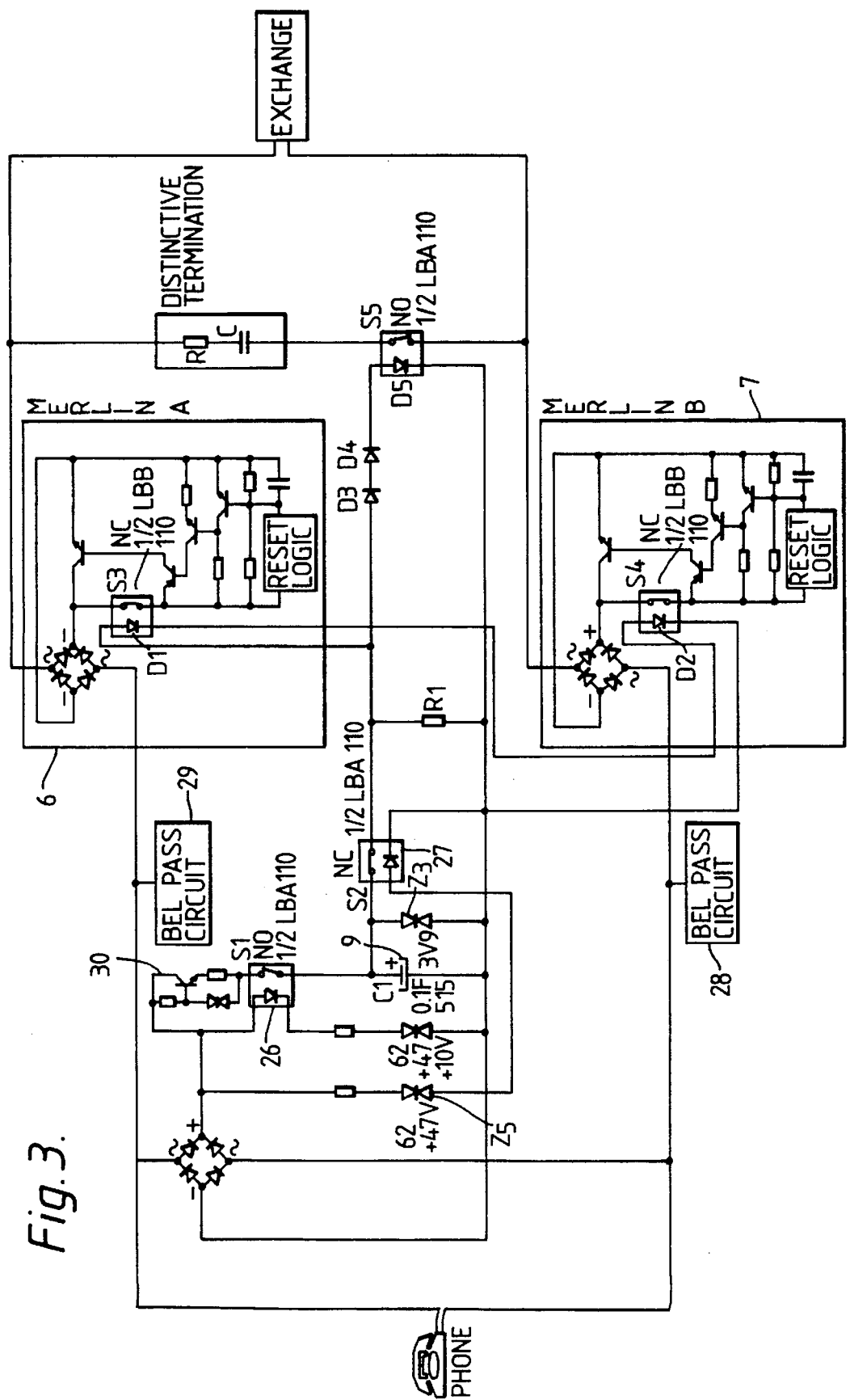
FIG. 3 is a circuit diagram of another form of the arrangement

FIG. 3 shows a modification of the circuit in FIG. 2. The circuit works essentially in the same way as that shown in FIG. 2, the line switches 6 and 7 being controlled by the control circuitry comprising charge reservoir 9, and solid state relays 26 and 27.

In this circuit, however, only one current limiting circuit 30 is employed which limits the current flowing through solid state relay 26. As the line voltage is increased so that the voltage across Zener diode $Z_5$ is greater than 110 V, current will flow through the solid state relay 27 LED and cause the relay to open. A small further increase of 10 V in the line voltage will cause current to flow through solid state relay 26 and charge the charge reservoir 9 until the voltage across the charge reservoir is 3.9 V as determined by Zener diode $Z_3$.

I claim:

1. A switching arrangement which can be connected in a communications channel, the communications channel comprising a pair of lines, the switching arrangement, in use, being connected between a set of exchange-side terminal equipment and a set of subscriber-side terminal equipment, the arrangement comprising:
   (i) first and second line switches, each of which, in use, is series connected in one of the lines, each line switch
      (a) comprising a control terminal, and
      having a closed state in which it will pass normal line current, and an open state in which it will pass at most a reduced line current; and
   (ii) a control circuit for the line switches, the control circuit, in use, being connected to the channel between the subscriber-side terminal equipment and the line switches, and comprising:
      (a) a charge reservoir which is connected between the lines;
      (b) a reservoir charging switch which
         (bi) is connected in series with the charge reservoir, and
         (bii) controls the charging of the reservoir in response to a signal on the lines; and
      (c) a reservoir discharging switch which
         (ci) is controlled by a signal on the lines, and
         (cii) will allow the reservoir when charged to energize the control terminals of the line switches
   so that, when the line switches are opened by the control circuit, the line switches can be maintained in an open state for a period of time by discharging the reservoir.

2. An arrangement as claimed in claim 1, wherein the line switches each comprise a solid state relay.

3. An arrangement as claimed in claim 1, wherein the line switches each comprise a switching transistor whose base or gate voltage is controlled by an overcurrent control element that can turn on thereby switching the switching transistor off.

4. An arrangement as claimed in claim 3, wherein the line switches each include a solid state relay that turns the switching transistor off.

5. An arrangement as claimed in claim 1 which includes means for reclosing the line switches a predetermined time after they have opened.

6. An arrangement as claimed in any claim 1, wherein the reservoir charging and/or discharging switches comprise solid state relays.

7. An arrangement as claimed in claim 1, wherein the reservoir charging and/or discharging switches each are controlled by a d.c. voltage on the lines.

8. An arrangement as claimed in claim 7, where in the reservoir charging switch is normally open and is closed when the line voltage is raised to a first voltage (V1), and the reservoir discharging switch is normally closed and is opened when the line voltage is raised to a second voltage (V2) which is higher that V1, so that the reservoir can be charged by raising the line voltage to about V2 for a period of time, and the line switches can then be opened by reducing the line voltage to a voltage below V1, thereby allowing the reservoir to energise the control terminals of the line switches.

9. An arrangement as claimed in claim 1, which includes a ringing bypass switching circuit associated with each line that will prevent triggering of the line switches by ringing signals on the lines.

10. An arrangement as claimed in claim 1, which includes a shunt switching circuit that can connect the lines together to enable a loopback test to be performed on the channel.

11. An arrangement as claimed in claim 10 wherein the shunt switching circuit can connect the lines together via a distinctive termination.

12. A communications circuit comprising:

A. a communications channel comprising a pair of lines; and

B. a switching arrangement connected in the communications channel between a set of exchange-side terminal equipment and a set of subscriber-side terminal equipment, the arrangement comprising:
  (i) first and second line switches, each of which is series connected in one of the lines, each line switch
    (a) comprising a control terminal, and
    (b) having a closed state in which it will pass normal line current, and an open state in which it will pass at most a reduced line current; and
  (ii) a control circuit for the line switches, the control circuit being connected to the channel between the subscriber-side terminal equipment and the line switches, and comprising:
    (a) a charge reservoir which is connected between the lines;
    (b) a reservoir charging switch which
      (bi) is connected in series with the charge reservoir, and
      (bii) controls the charging of the reservoir in response to a signal on the lines; and
    (c) a reservoir discharging switch which
      (ci) is controlled by a signal on the lines, and
      (cii) will allow the reservoir when charged to energize the control terminals of the line switches;
so that, when the line switches are opened by the control circuit, the line switches can be maintained in an open state for a period of time by discharging the reservoir.

* * * * *